L. G. BIGELOW.
Solar Camera.
No. 70,509. Patented Nov. 5, 1867.
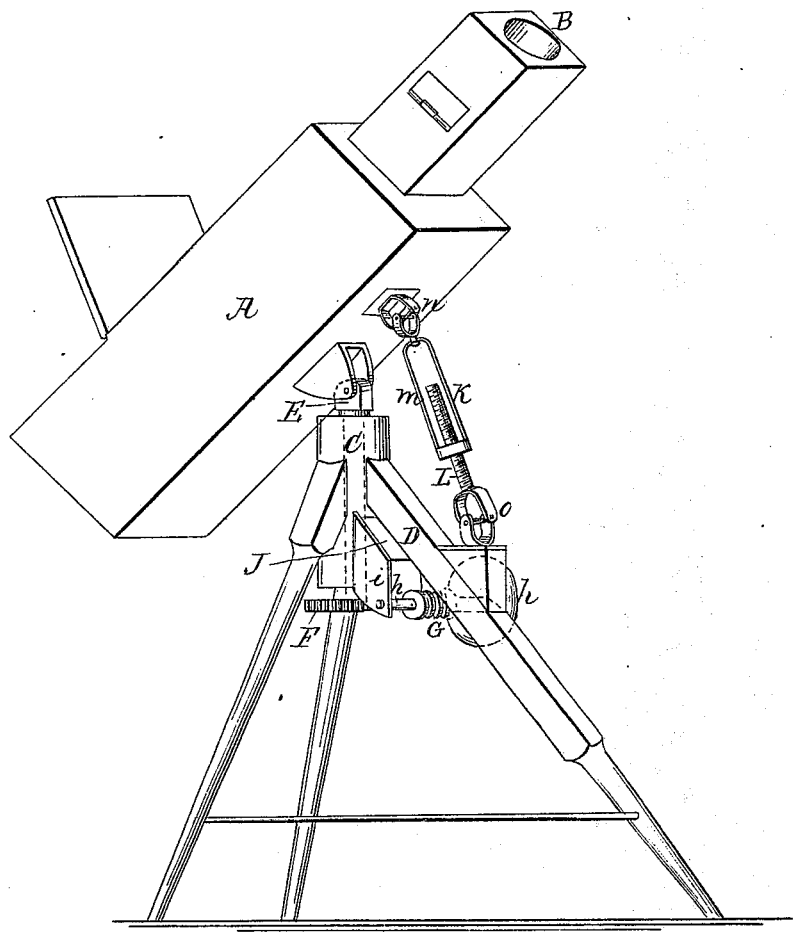

United States Patent Office.

LYMAN G. BIGELOW, OF ALBION, MICHIGAN.

Letters Patent No. 70,509, dated November 5, 1867.

---

IMPROVEMENT IN SOLAR CAMERAS.

---

The Schedule referred to in these Letters Patent and making part of the same.

---

TO ALL WHOM IT MAY CONCERN:

Be it known that I, LYMAN G. BIGELOW, of Albion, in the county of Calhoun, and State of Michigan, have invented a new and useful Improvement in Solar-Printing Camera; and I do hereby declare that the following is a full, clear, and exact description thereof, which will enable others skilled in the art to make and use the same, reference being had to the accompanying drawings, forming part of this specification.

This invention relates to a new and improved method of moving and guiding the condensing-lens of a solar-printing camera, whereby it is adjusted so as to correspond with the position of the sun during the day, and during the different seasons of the year. And the invention consists in attaching the dark chamber of the camera to a tripod-stand by a jointed pivot or shaft, and revolving the camera on the shaft, (which shaft passes through the post of the tripod-stand,) with a worm-screw and gear-wheel, and in governing the position of the condensing-lens of the camera by connecting the dark chamber to one of the legs of the tripod by an adjustable connection which has a universal joint at each of its ends, as will be hereinafter more fully described.

The drawing is a perspective view of the arrangement.

A represents the dark chamber, with the condensing-lens at the elevated end, as seen at B. C is the post of the tripod; and D represents the leg of the tripod with which the dark chamber is connected. E is the shaft or pivot which is jointed to the dark chamber, and which passes through the post of the tripod, (lengthwise.) F is a gear-wheel, upon the lower end of the shaft E. G is a worm-screw upon a horizontal shaft, $h$, which shaft is supported by hangers, $i$, one only of which is seen in the drawing. These hangers are attached to a cross-piece, J, which is fastened to the leg D of the tripod. K represents the connection between the leg D and the dark chamber. L is a screw, with a universal joint where it is connected to the leg D. $m$ is a stirrup, whose lower end forms a nut for the screw. This stirrup is connected with the dark chamber by a universal joint. This joint is marked $n$; the lower one is marked $o$. Upon the end of the worm-screw shaft G there is a hand-wheel, seen at $p$. By turning this hand-wheel the camera is turned on the shaft E, and the camera being connected with the fixed leg D of the tripod, the effect of such turning will be to either depress or elevate the condensing-lens B. The connection K would form the radius of a circle through which its upper end would move, the design being to move the lens B through such a curve that the sun's rays will be directed fully upon it for any desired length of time during the day. By attaching clock-work to the shaft G, and thus moving it, the motion may be made to correspond with the motion of the earth, thus insuring a uniform intensity of light during that time.

To adjust the camera to the sun's rays during the varying seasons of the year, it is only necessary to lengthen or shorten the connection K, which is done by turning the stirrup $m$ (which is attached to the universal joint $n$ by a swivel-joint) upon the screw L.

What I claim as new, and desire to secure by Letters Patent, is—

1. The universal-jointed connection K, constructed and arranged substantially as described, for the purposes set forth.

2. I claim operating a solar-printing camera from east to west and to and from the zenith, (being a combination of two motions,) by turning a single screw, substantially as shown and described.

The above specification of my invention signed by me this 22d day of April, 1867.

LYMAN G. BIGELOW.

Witnesses:
    FITCH R. WILLIAMS,
    F. D. DIETTERICH.